US012770584B2

(12) United States Patent
Kang et al.

(10) Patent No.: US 12,770,584 B2
(45) Date of Patent: Oct. 20, 2026

(54) DISPLAY DEVICE AND OPERATING METHOD THEREOF

(71) Applicant: SAMSUNG ELECTRONICS CO., LTD., Suwon-si (KR)

(72) Inventors: Shinho Kang, Suwon-si (KR); Daewoong Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/348,291

(22) Filed: Oct. 2, 2025

(65) Prior Publication Data

US 2026/0105895 A1 Apr. 16, 2026

Related U.S. Application Data

(63) Continuation of application No. PCT/KR2025/014016, filed on Sep. 9, 2025.

(30) Foreign Application Priority Data

Oct. 11, 2024 (KR) ........................ 10-2024-0138416

(51) Int. Cl.
*G09G 3/34* (2006.01)

(52) U.S. Cl.
CPC ....... *G09G 3/344* (2013.01); *G09G 2330/025* (2013.01)

(58) Field of Classification Search
CPC ..... G09G 3/34; G09G 3/344; G09G 2330/025
See application file for complete search history.

(56) References Cited

U.S. PATENT DOCUMENTS 6,100,867 A 8/2000 Gyouten
9,836,114 B1 * 12/2017 Lim ...................... G06F 1/3265

(Continued)

FOREIGN PATENT DOCUMENTS

JP 2005-99770 A 4/2005
JP 2010-49101 A 3/2010

(Continued)

OTHER PUBLICATIONS

International Search report (PCT/ISA/210) and Written Opinion (PCT/ISA/237) issued Dec. 17, 2025 by the International Searching Authority in International Patent Application No. PCT/KR2025/014016.

*Primary Examiner* — Kenneth B Lee, Jr.
(74) *Attorney, Agent, or Firm* — Sughrue Mion, PLLC

(57) ABSTRACT

A display device may include: a display panel including a plurality of display blocks; a battery configured to supply electric energy to the display panel; a plurality of driver integrated circuits (ICs) respectively connected to the plurality of display blocks; at least one processor including processing circuitry; and a memory storing instructions and including at least one storage medium, wherein, when individually or collectively executed by the at least one processor, the instructions cause the display device to: identify a state of charge of the battery; identify a remaining charge of the battery as being in a first range based on the state of the charge; and based on a screen transition event of the display panel and the remaining charge of the battery being in the first range, control the plurality of driver ICs to turn on the plurality of display blocks at different times in a first order.

20 Claims, 12 Drawing Sheets

(56) References Cited

U.S. PATENT DOCUMENTS

| | | | | |
|---|---|---|---|---|
| 9,990,784 | B2 | 6/2018 | McMahan et al. | |
| 10,854,134 | B2 | 12/2020 | Kim | |
| 11,080,336 | B2 | 8/2021 | Van Dusen | |
| 11,170,451 | B2 | 11/2021 | Schneider | |
| 12,387,689 | B1 * | 8/2025 | Bobcik | G06F 3/013 |
| 2017/0084246 | A1 * | 3/2017 | Joshi | G06F 3/1446 |
| 2019/0197945 | A1 * | 6/2019 | Kim | G09G 3/36 |

FOREIGN PATENT DOCUMENTS

| | | | |
|---|---|---|---|
| JP | 2015-219383 | A | 12/2015 |
| KR | 10-2008-0001935 | A | 1/2008 |
| KR | 10-1227811 | B1 | 1/2013 |
| KR | 10-2047676 | B1 | 11/2019 |
| KR | 10-2023-0001865 | A | 1/2023 |

* cited by examiner

DISPLAY DEVICE AND OPERATING METHOD THEREOF

CROSS-REFERENCE TO RELATED APPLICATION(S)

This application is a continuation of International Application No. PCT/KR2025/014016, filed on Sep. 9, 2025, in the Korean Intellectual Property Receiving Office, which claims priority to Korean Patent Application No. 10-2024-0138416, filed on Oct. 11, 2024, in the Korean Intellectual Property Office, the disclosures of which are incorporated by reference herein in their entireties.

BACKGROUND

1. Field

The present disclosure relates to a display device and an operating method thereof, and more particularly, to a display device for driving a display by using electric energy output from a battery, and an operating method thereof.

2. Description of Related Art

With advances in electronic technology, technological development for various types of electronic devices has accelerated. In particular, technological development for various types of display devices for providing content to a user on displays continues to progress.

SUMMARY

According to an aspect of the disclosure, a display device may include: a display panel including a plurality of display blocks; a battery configured to supply electric energy to the display panel; a plurality of driver integrated circuits (ICs) respectively connected to the plurality of display blocks; at least one processor including processing circuitry; and a memory storing instructions and including at least one storage medium, wherein, when individually or collectively executed by the at least one processor, the instructions cause the display device to: identify a state of charge of the battery; identify a remaining charge of the battery as being in a first range based on the state of the charge; and based on a screen transition event of the display panel and the remaining charge of the battery being in the first range, control the plurality of driver ICs to turn on the plurality of display blocks at different times in a first order.

According to an aspect of the disclosure, an operating method of a display device, may include: identifying a state of charge of a battery supplying electric energy to a display panel including a plurality of display blocks; identifying a remaining charge of the battery as being in a first range based on the state of the charge; and based on a screen transition event of the display panel and the remaining charge of the battery being in the first range, controlling a plurality of driver integrated circuits (ICs) respectively connected to the plurality of display blocks to turn on the plurality of display blocks at different times in a first order.

According to an aspect of the disclosure, a storage medium may store computer-readable instructions, wherein, when individually or collectively executed by at least one processor of a display device, the instructions may cause the display device to: identify a state of charge of a battery supplying electric energy to a display panel including a plurality of display blocks; identify a remaining charge of the battery as being in a first range based on the state of the charge; and based on a screen transition event of the display panel and the remaining charge of the battery being in the first range, control a plurality of driver integrated circuits (ICs) respectively connected to the plurality of display blocks to turn on the plurality of display blocks at different times in a first order.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
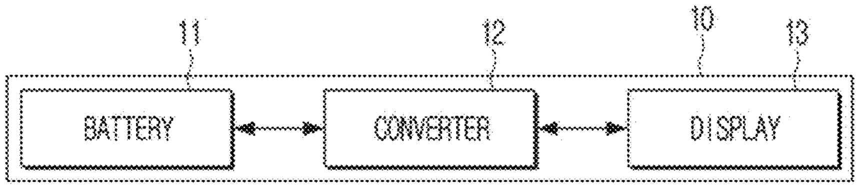
FIG. 1 is a diagram for schematically describing a display device according to a comparative example.

Hereinafter, the embodiments of the present disclosure are described in detail with reference to the accompanying drawings.

Terms used in the specification are briefly described, and the present disclosure is then described in detail.

General terms that are currently widely used are selected as terms used in embodiments of the present disclosure in consideration of their functions in the present disclosure, and may be changed based on the intention of those skilled in the art or a judicial precedent, the emergence of a new technique, or the like. In addition, in a specific case, terms arbitrarily chosen by an applicant may exist. In this case, the meanings of such terms are mentioned in detail in corresponding descriptions of the present disclosure. Therefore, the terms used in the present disclosure need to be defined on the basis of the meanings of the terms and the contents throughout the present disclosure rather than simple names of the terms.

In the present disclosure, an expression "have", "may have", "include", "may include" or the like, indicates existence of a corresponding feature (for example, a numerical value, a function, an operation or a component such as a part), and does not exclude existence of an additional feature.

An expression, "at least one of A or/and B" may indicate either "A or B", or "both of A and B."

Expressions "first", "second" and the like, used in the present disclosure may indicate various components regardless of the sequence or importance of the components. The expression is used only to distinguish one component from another component, and does not limit the corresponding component.

If any component (for example, a first component) is mentioned to be "(operatively or communicatively) coupled with/to" or "connected to" another component (for example, a second component), it should be understood that any component is directly coupled to another component or coupled to another component through still another component (for example, a third component).

A term of a singular number may include its plural number unless explicitly indicated otherwise in the context. It should be understood that a term "include" or "have" used in this application specifies the presence of features, numerals, steps, operations, components, parts, or combinations thereof, which are mentioned in the specification, and does not preclude the presence or addition of one or more other features, numerals, steps, operations, components, parts, or combinations thereof.

In the present disclosure, a "module" or a "~er/~or" may perform at least one: or operation, and be implemented by hardware, software, or a combination of hardware and software. In addition, a plurality of "modules" or a plurality of "~ers/~ors" may be integrated in at least one module and be implemented by the processor except for a "module" or a "~er/or" that needs to be implemented by a specific hardware.

In addition, in this specification, the term "signal" may include not only electrical signals but also signals in the form of sound waves, and in case of the electrical signals, the signals may be analog signals as well as digital signals. For example, the expression "audio signal (or noise signal)" indicates the sound wave (or radio wave) signal if the signal is positioned outside the display device, and indicates the electrical signal if the signal is positioned inside the display device, depending on a position of the signal. In addition, signal processing r the like inside the display device described below may refer to not only digital signal processing, but also analog signal processing or a signal processing method that uses a mixture of analog and digital methods.

In addition, in this specification, the term "filter" indicates removing a specific component (for example, a specific frequency region or a specific pattern), and the filter may be a digital filter or an analog filter.

FIG. 1 is a diagram for schematically describing a display device according to a comparative example.

Referring to FIG. 1, a display device 10 according to the comparative example may include a battery 11, a converter 12, and a display 13. In an example, the display device 10 may supply electric energy stored in the battery 11 to the display 13. In this process, the display device 10 may boost the electric energy stored in the battery 11 by using the converter 12 and supply the same to the display 13.

Meanwhile, an overcurrent supply or an inrush current supply may occur during a process for supplying electric energy to the display if the capacity of the battery included in the display device 10 is small or if a remaining charge (or charged level) of the battery is low. This phenomenon occurs due to a momentarily increased amount of power consumed by the display.

Accordingly, the following description describes a display device for preventing the overcurrent supply or the inrush current supply even if the device includes a low-power battery or if the remaining charge of the battery is low, and an operating method thereof.

Figure 2:
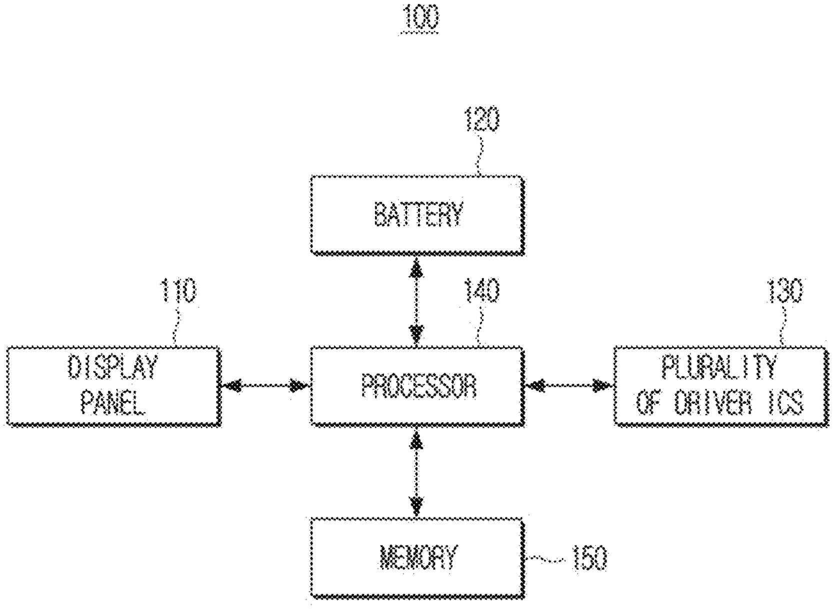
FIG. 2 is a block diagram showing a configuration of a display device according to one or more embodiments.

FIG. 2 is a block diagram showing a configuration of a display device according to one or more embodiments.

Referring to FIG. 2, a display device 100 may include a display panel 110, a battery 120, a plurality of driver integrated circuits (ICs) 130, at least one processor 140, and a memory 150.

According to one or more embodiments, the display device 100 may be implemented as any of various devices capable of providing content by including a display, such as an electronic book, a smart television (TV), a tablet, a monitor, a desktop computer, or a laptop computer, according to one or more embodiments. The display device according to one or more embodiments of the present disclosure is not limited to the above-described devices, and the display device may be implemented as a display device having two or more functions of the above-described devices.

According to one or more embodiments, the display panel 110 may be implemented as an electrophoretic display. According to one or more embodiments, the display panel 110 may be implemented as a display having characteristics similar to those of paper printouts using electronic ink (e-ink). According to one or more embodiments, the display panel 110 may provide a screen by reflecting external light without a separate backlight. For example, the display panel 110 may provide the screen by using natural light (or reflected light) instead of emitting light, and may thus be operated using low power.

According to one or more embodiments, the display panel 110 may consumes power only for refreshing the screen (or switching the screen), and may continuously provide the screen after refreshing the screen without additional power consumption. Due to these advantages, the electronic paper display is utilized in e-books, price tags, menu boards, or the like.

According to one or more embodiments, the display panel 110 may be implemented as a display including a self-luminous element, or a display including a non self-luminous element. For example, the display panel 110 may be implemented as any of various types of displays, such as a liquid crystal display (LCD), an organic light-emitting diode (OLED) display, a light emitting diode (LED) display, a micro-LED display, a mini-LED display, a plasma display panel (PDP), a quantum dot (QD) display, or a quantum dot light-emitting diode (QLED) display. The display panel 110 may be implemented as a touchscreen combined with a touch sensor, a flexible display, a rollable display, a three-dimensional (3D) display, a display in which the plurality of display modules are physically connected with each other, or the like. The processor may control the display panel 110 to output an obtained output image according to various embodiments described above. Here, the output image can be a high-resolution image of 4K or 8K or higher. According to one or more embodiments, the display panel 110 may include a plurality of display blocks. The display blocks are described in detail with reference to FIG. 9.

According to one or more embodiments, the battery 120 may store electric energy. In an example, the battery 120 may supply the stored electric energy to the display panel 110. In an example, the battery 120 may be implemented as a low-power battery having a full charge voltage less than a predetermined value. In an example, the full charge voltage of the battery 120 may be 3.6 volts (V), is not limited to, and may have a different value.

According to one or more embodiments, the plurality of driver ICs 130 may be implemented as semiconductor devices that transmit drive signals for displaying the contents (e.g., images) on the display panel 110. In an example, the plurality of driver ICs 130 may respectively be connected to a plurality of display blocks. In an example, the plurality of driver ICs 130 may respectively be connected to a corresponding display block. In an example, the driver IC may control the display block to be turned on or off based on one or more control signals from at least one processor 140. For example, the driver IC may be implemented as a gate driver integrated circuit (IC) that applies a drive input to the display block. In an example, if the driver IC is turned on, the corresponding display block may receive the electric energy. This configuration is described in detail with reference to FIG. 9.

At least one processor 140 (hereinafter, the processor) may be electrically connected to the display panel 110, the battery 120, the plurality of driver ICs 130, and the memory 150, and control overall operations of the display device 100. The processor 140 may include one or more processors. In detail, the processor 140 may perform the operation of the display device 100 by executing at least one instruction stored in the memory 150 according to the various embodiments of the present disclosure.

According to one or more embodiments, the processor 140 may be implemented as a digital signal processor (DSP), a microprocessor, a graphic processing unit (GPU), an artificial intelligence (AI) processor, a neural processing unit (NPU), or a timing controller (TCON) that processes a digital signal. However, the processor 140 is not limited thereto, and may include at least one of a central processing unit (CPU), a micro controller unit (MCU), a micro processing unit (MPU), a controller, an application processor (AP), a communication processor (CP), an ARM processor, or may be defined by a relevant term. In addition, the processor 140 may be implemented as a system-on-chip (SoC) or a large scale integration (LSI) that has a processing algorithm embedded therein, or may be implemented as an application-specific integrated circuit (ASIC) or in the form of a field programmable gate array (FPGA).

The memory 150 may store data required for the various embodiments. The memory 150 may be implemented in the form of a memory embedded in the display device 100 or in the form of a memory detachably attached to the display device 100, based on a purpose of data storage. For example, data for operating the display device 100 may be stored in the memory embedded in the display device 100, and data for expanded functions of the display device 100 may be stored in the memory detachably attached to the display device 100.

Meanwhile, the memory embedded in the display device 100 may be implemented as at least one of a volatile memory (e.g., a dynamic random access memory (DRAM), a static RAM (SRAM), or a synchronous dynamic RAM (SDRAM)) or a non-volatile memory (e.g., an one time programmable read only memory (OTPROM), a programmable ROM (PROM), an erasable and programmable ROM (EPROM), an electrically erasable and programmable ROM (EEPROM), a mask ROM, or a flash ROM), a flash memory (e.g., a NAND flash or a NOR flash), a hard drive, or a solid state drive (SSD)). In addition, the memory detachably attached to the display device 100 may be implemented in the form of a memory card (e.g., a compact flash (CF), a secure digital (SD), a micro secure digital (Micro-SD), a mini secure digital (Mini-SD), an extreme digital (xD), or a multi-media card (MMC)), or an external memory which may be connected to a universal serial bus (USB) port (e.g., a USB memory).

According to one or more embodiments, the processor 140 may identify a state of charge of the battery 120. In an example, the processor 140 may be connected to the battery 120. In an example, the processor 140 may identify a remaining charge of the battery 120 based on a voltage of the battery 120 (e.g., a charge voltage of the battery 120).

According to one or more embodiments, the processor 140 may identify an order in which the plurality of display blocks are turned on.

In an example, the processor 140 may identify whether the remaining charge of the battery 120 falls within a predetermined first range based on the identified state of charge. In an example, the processor 140 may identify a first order in which the plurality of display blocks are turned on if the remaining charge of the battery 120 is identified as being in the first range based on the identified state of charge.

In an example, the order in which the plurality of display blocks are turned on may refer to an order (or drive order) in which the control signals are transmitted to the driver ICs corresponding to the display blocks. For example, the first order may refer to an order in which a first control signal is transmitted to a first driver IC corresponding to a first display block and then a second control signal is transmitted to a second driver IC corresponding to a second display block. In an example, information on an order corresponding to each range corresponding to the remaining charge of the battery 120 may be stored in the memory 150. For example, the first order may refer to an order corresponding to the first range described above. In an example, the order in which the plurality of display blocks are turned on may refer to an order in which at least some display blocks among the plurality of display blocks are turned on and the remaining display blocks are then turned on.

According to one or more embodiments, the processor 140 may identify a screen transition event of the display panel 110. In an example, the screen transition event may refer to an event in which electric energy is supplied to the display panel 110. For example, if the display panel 110 is implemented as an electrophoretic display (EPD), the display panel 110 may require the electric energy only if the screen is transitioned (or refreshed). The processor 140 may supply the electric energy to the display panel 110 based on whether the event in which the screen is transitioned occurs.

In an example, the processor 140 may control the plurality of driver ICs 130 to be turned on in the first order in which the plurality of display blocks are identified, if the screen transition event occurs (or is identified). For example, the identified first order may refer to an order in which the first block among the plurality of display blocks is turned on and the second block is then turned on. The processor 140 may transmit the first control signal for turning on the first block to the first driver IC corresponding to the first block among the plurality of driver ICs 130. After the first control signal is transmitted to the first driver IC, the processor 140 may transmit the second control signal for turning on the second block to the second driver IC corresponding to the second block among the plurality of driver ICs 130. However, the present disclosure is not limited thereto, and in an example, the second control signal may also be transmitted to the second driver IC while the first control signal is transmitted to the first driver IC.

According to one or more embodiments, the display device 100 may further include a converter for boosting an output voltage of the battery 120 and supplying the boosted output voltage to the display panel 110. In an example, the converter may be implemented as a direct current to direct current (DC-to-DC) converter for boosting a DC voltage and supplying the same to the display panel 110. In an example, the processor 140 may supply the electric energy boosted using the converter to the display panel 110.

Momentary power consumption of the display panel 110 may increase if each of the plurality of display blocks is turned on simultaneously based on the electric energy supplied from the (low-power) battery 120 having the full charge voltage less than the predetermined value. Accordingly, an overcurrent supply or an inrush current supply may occur in a process for supplying the electric energy to the display panel 110. A possibility of the overcurrent supply or the inrush current supply may increase as the remaining charge of the battery 120 becomes relatively small.

According to the above-described example, even if the display device 100 supplies the electric energy to the display panel 110 from the low-power battery, the display device 100 may prevent the overcurrent supply or the inrush current supply, and prevent the display device 100 from entering over current protection (OCP), by sequentially turning on the plurality of display blocks included in the display panel 110.

Figure 3:
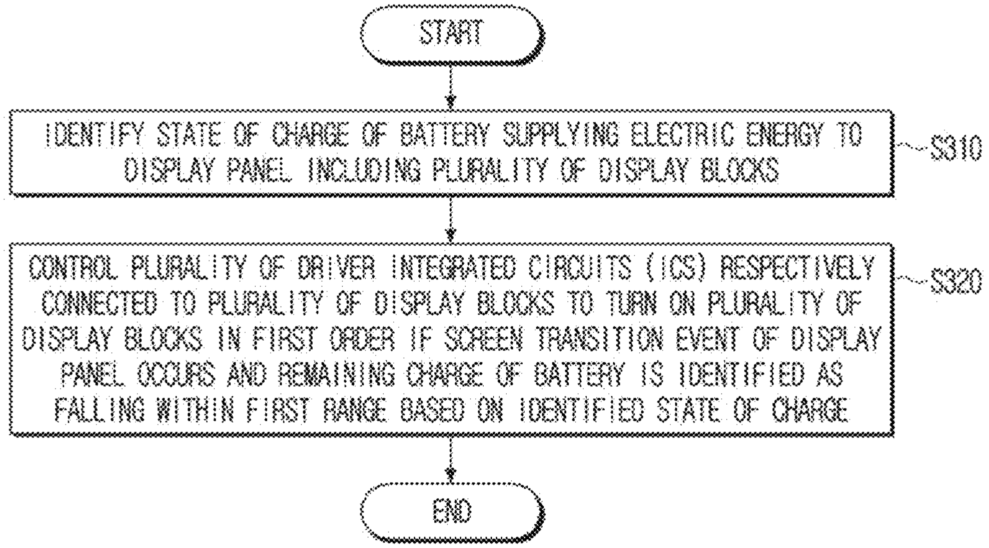
FIG. 3 is a flowchart for describing an operating method of a display device according to one or more embodiments.

FIG. 3 is a flowchart for describing an operating method of a display device (e.g., the display device 100 in FIG. 2) according to one or more embodiments.

Referring to FIG. 3, according to one or more embodiments, the operating method may include identifying the state of charge of the battery (e.g., the battery 120 in FIG. 2) supplying the electric energy to the display panel (e.g., the display panel 110 in FIG. 2) including the plurality of display blocks (e.g., the display block in FIG. 2) (S310). In an example, the display device may identify the state of charge of the battery. In an example, the display device may identify the remaining charge of the battery based on the charge voltage of the battery.

According to one or more embodiments, the operating method may include identifying the first order (e.g., the first order in FIG. 2) in which the plurality of display blocks are turned on if the remaining charge of the battery is identified as being in the first range based on the identified state of charge (S320).

In an example, the display device may identify the remaining charge of the battery based on the state of charge of the battery. In an example, the display device may identify whether the remaining charge of the battery falls within the first range. In an example, the display device may identify the first order corresponding to the first range if the remaining charge of the battery is identified as being in the first range. In an example, the first order may be the drive order for the plurality of display blocks included in the display panel.

According to one or more embodiments, the operating method may include controlling the plurality of driver integrated circuits (ICs, e.g., the plurality of driver ICs 130 in FIG. 2) respectively connected to the plurality of display blocks to turn on the plurality of display blocks in the first order in which the plurality of display blocks are identified (S330) if the screen transition event of the display panel (e.g., the screen transition event in FIG. 2) occurs.

In an example, the display device may control the plurality of driver ICs based on the identified first order if the screen transition event of the display panel occurs. In an example, the identified first order may refer to the order in which the first block among the plurality of display blocks is turned on and the second block is then turned on. The display device may transmit the first control signal for turning on the first block to the first driver IC corresponding to the first block among the plurality of driver ICs. After the first control signal is transmitted to the first driver IC, the display device may transmit the second control signal for turning on the second block to the second driver IC corresponding to the second block among the plurality of driver ICs.

Figure 4:
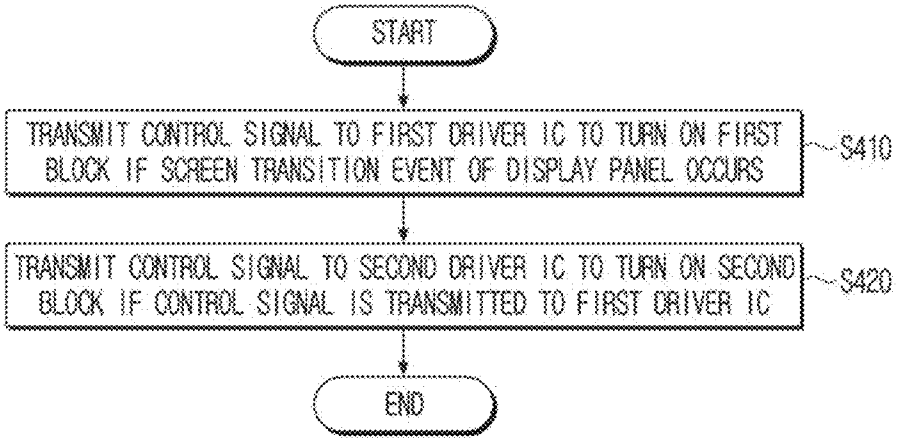
FIG. 4 is a flowchart for describing a method for transmitting one or more control signals to a drive integrated circuit (IC) according to one or more embodiments.

FIG. 4 is a flowchart for describing a method for transmitting the control signals to the drive integrated circuit (IC, e.g., the plurality of driver ICs 130 in FIG. 2) according to one or more embodiments.

Referring to FIG. 4, according to one or more embodiments, the operating method may include transmitting the first control signal to a first driver IC (e.g., the first driver IC in FIG. 2) to turn on a first block if a screen transition event (e.g., the screen transition event in FIG. 2) of a display panel (e.g., the display panel 110 in FIG. 2) occurs (S410).

In an example, the display panel may include a plurality of display blocks (e.g., the display blocks in FIG. 2), and the plurality of display blocks may include the first block and a second block. In an example, the plurality of driver ICs may include the first driver IC corresponding to the first block and a second driver IC corresponding to the second block (e.g., the second driver IC in FIG. 2).

In an example, the display device may identify the first order in which the first block is turned on and the second block is then turned on. In an example, the display device may transmit the first control signal to the first driver IC to preferentially turn on the first block among the plurality of display blocks if the screen transition event of the display panel occurs. In an example, if the driver IC according to the present disclosure is implemented as the gate driver IC, the first control signal transmitted to the first driver IC may refer to a signal for controlling the first driver IC to be turned on to supply the electric energy to the first block.

According to one or more embodiments, the operating method may include transmitting the second control signal to the second driver IC to turn on the second block if the first control signal is transmitted to the first driver IC (S420).

In an example, the display device may transmit the second control signal to the second driver IC to turn on the second block if the first control signal is transmitted to the first driver IC. In an example, the second control signal transmitted to the second driver IC may refer to a signal for controlling the second driver IC to be turned on to supply the electric energy to the second block.

Alternatively, in an example, the display device may transmit the second control signal to the second driver IC even before the first control signal is completely transmitted to the first driver IC. For example, the display device may transmit the second control signal to the second driver IC even while the first control signal is transmitted to the first driver IC. In an example, the display device may identify a drive timing for turning on the second block after the first block is turned on, and transmit the first control signal to the first driver IC and the second driver IC based on the identified drive timing.

However, the present disclosure is not limited thereto, and the driver IC according to the present disclosure may be implemented as a switch in an example. In an example, the display device may turn on a switch corresponding to the first block to supply the electric energy to the first block. Alternatively, in an example, the display device may turn on a switch corresponding to the second block to supply the electric energy to the second block.

According to one or more embodiments, each of the first block and the second block may include at least one display block. In an example, each of the first block and the second block may be a group including the plurality of blocks (for example, four blocks). In an example, if the first block is the group including the plurality of blocks, the display device may include the driver IC corresponding to each of the plurality of blocks included in the first block. In an example, if the second block is the group including the plurality of blocks, the display device may include the driver IC corresponding to each of the plurality of blocks included in the second block.

In an example, the display device may group a plurality of display blocks based on a drive order for the display blocks (e.g., the first order in FIG. 2). For example, the first order corresponding to a first range (e.g., the first range in FIG. 2) may be an order in which the eight display blocks are sequentially driven one by one. In this case, eight groups may be formed.

Alternatively, for example, a second order corresponding to the second range may be an order in which four groups each including two display blocks among the eight display blocks are formed, and each group is driven sequentially. In this case, after two display blocks included in a first group among the four groups are turned on simultaneously, two blocks included in a second group different from the first group may be turned on simultaneously. In an example, the display device may identify the drive order for a plurality of display groups.

Figure 5:
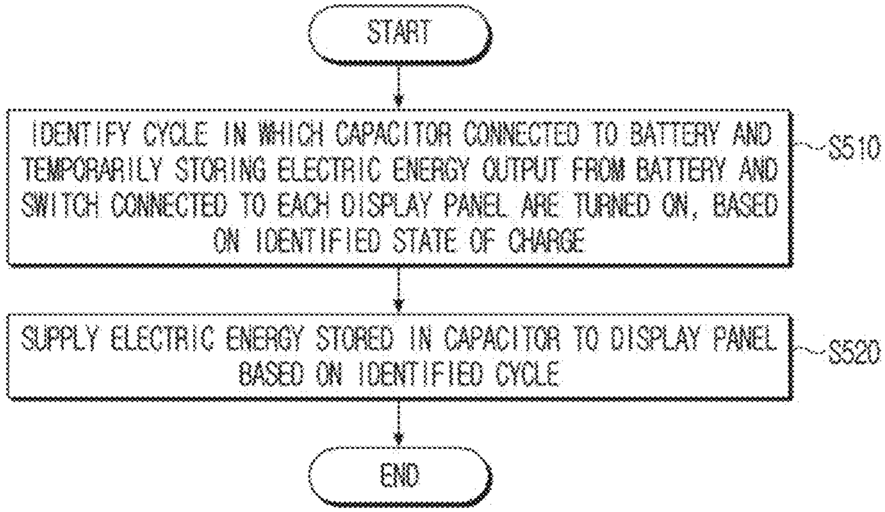
FIG. 5 is a flowchart for describing a method for supplying electric energy to a display panel according to one or more embodiments.

FIG. 5 is a flowchart for describing a method for supplying electric energy to a display panel according to one or more embodiments.

Referring to FIG. 5, according to one or more embodiments, the operating method may include identifying a cycle in which a capacitor connected to a battery and temporarily storing electric energy output from the battery (e.g., the battery 120 in FIG. 2) and a switch connected to each display panel (e.g., the display panel 110 in FIG. 2) are turned on, based on the identified state of charge (e.g., the state of charge in FIG. 2) (S510).

In an example, a display device (e.g., the display device 100 in FIG. 2) may include the capacitor connected to the battery and temporarily storing the electric energy output from the battery. In an example, the display device may include a switch connected to each of the capacitor and the display panel. In an example, the display device may supply the electric energy temporarily stored in the capacitor to the display panel by turning on the switch.

In an example, the display device may identify (or determine) a cycle corresponding to the remaining charge of the battery (e.g., the remaining charge in battery 120 in FIG. 2) if the state of charge of the battery is identified. In an example, information on the cycle corresponding to each predetermined range related to the remaining charge of the battery may be stored in a memory (e.g., the memory 150 in FIG. 2). In an example, if the remaining charge of the battery is in the predetermined range, the display device may identify a turn-on cycle of a switch corresponding to the predetermined range.

According to one or more embodiments, the operating method may include supplying the electric energy stored in the capacitor to the display panel based on the identified cycle (S520).

In an example, the display device may turn off the switch after the switch is turned on for a predetermined time period. For example, the display device may turn off the switch after a first time period elapses after the switch is turned on. The display device may then turn on the turned-off switch again based on the identified cycle. This configuration is described in detail with reference to FIGS. 10 and 11.

In an example, the display device may turn on the switch based on the identified cycle if the cycle in which the switch is turned on is identified. In other words, a cycle for turning on the switch may be determined for situations when the battery charge is below a threshold. During such a cycle, the switch may be turned on. If the switch is turned on, the electric energy stored in the capacitor may be supplied to the display panel.

Figure 6:
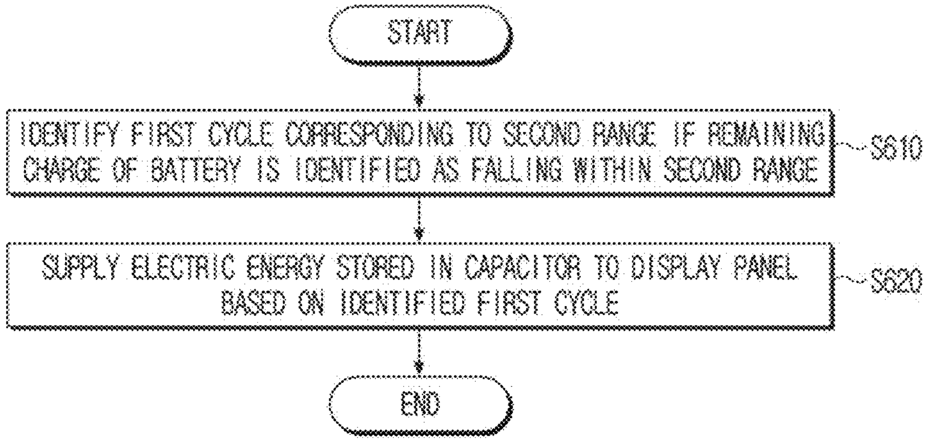
FIG. 6 is a flowchart for describing a method for supplying electric energy to a display panel according to one or more embodiments.

FIG. 6 is a flowchart for describing a method for supplying electric energy to a display panel (e.g., the display panel 110 in FIG. 2) according to one or more embodiments.

Referring to FIG. 6, according to one or more embodiments, the operating method may include identifying a first cycle (e.g., the cycle in which the switch in FIG. 5 is turned on) corresponding to the second range if the remaining charge of a battery (e.g., the battery 120 in FIG. 2) is identified as being in the second range (S610).

In an example, a display device (e.g., the display device 100 in FIG. 2) may identify the remaining charge of the battery based on the state of charge of the battery. In an example, the display device may identify a range in which the remaining charge of the battery is included based on information stored in a memory (e.g., the memory 150 in FIG. 2) (e.g., the information on the cycle in FIG. 5). In an example, if the remaining charge of the battery is identified as being in the second range, the display device may identify the first cycle corresponding to the identified second range.

According to one or more embodiments, the operating method may include supplying the electric energy stored in the capacitor (e.g., the capacitor in FIG. 5) to the display panel based on the identified first cycle (S620).

In an example, the display device may turn on the switch based on the identified first cycle if the first cycle related to the operation of the switch (e.g., the switch in FIG. 5) is identified. In an example, the display device may supply the electric energy stored in the capacitor to the display panel by turning on the switch based on the identified first cycle. In an example, the switch may be turned off after being turned on for the predetermined time period. In an example, the first cycle may be greater than the predetermined time period during which the switch is turned on.

Figure 7:
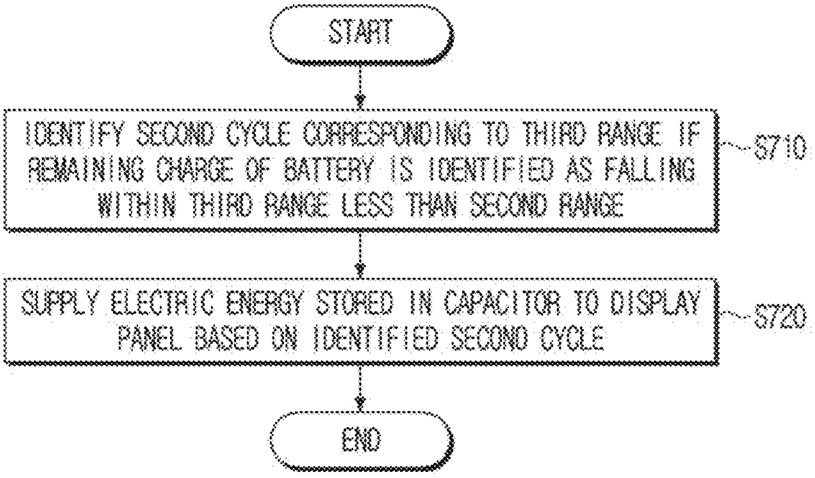
FIG. 7 is a flowchart for describing a method for supplying electric energy to a display panel according to one or more embodiments.

FIG. 7 is a flowchart for describing a method for supplying electric energy to a display panel (e.g., the display panel 110 in FIG. 2) according to one or more embodiments.

Referring to FIG. 7, according to one or more embodiments, the operating method may include identifying a second cycle (e.g., a cycle related to the operation of the switch (e.g., the switch in FIG. 5) corresponding to a third range if the remaining charge of a battery (e.g., the battery 120 in FIG. 2) is identified as being in the third range less than the second range (S710).

In an example, a display device (e.g., the display device 100 in FIG. 2) may identify the remaining charge of the battery based on a state of charge of the battery (e.g., the state of charge in FIG. 2). In an example, the display device may identify a range in which the remaining charge of the battery is included based on information stored in a memory (e.g., the memory 150 in FIG. 2) (e.g., the information on the cycle in FIG. 5).

In an example, it may be assumed that a cycle corresponding to the second range is the first cycle (e.g., the cycle related to the operation of the switch in FIG. 5), and a cycle corresponding to the third range, which indicates a range of values smaller than the second range, is the second cycle. In an example, the display device may identify the second cycle corresponding to the identified third range as an operation cycle (or turn-on cycle) of a switch (e.g., the switch in FIG. 5) if the remaining charge of the battery is identified as being in the third range less than the second range.

According to one or more embodiments, the operating method may include supplying the electric energy stored in a capacitor (e.g., the capacitor in FIG. 5) to the display panel based on the identified second cycle (S720).

In an example, the display device may supply the electric energy stored in the capacitor to the display panel based on the identified second cycle if the second cycle is identified as the operation cycle of the switch. In an example, the second cycle may be less (or shorter) than the first cycle.

In an example, a size of the cycle corresponding to the remaining charge of the battery may be reduced in proportion to the remaining charge of the battery. For example, as the remaining charge of the battery decreases, the cycle in which the switch is turned on may become shorter. As the remaining charge of the battery decreases, the possibility of the overcurrent supply or the inrush current supply occurring in the process for supplying the electric energy to the display panel may increase. Accordingly, the display device may efficiently control an amount of current to which the display device may respond by reducing the size of the cycle in which the switch is turned on as the remaining charge of the battery decreases. Accordingly, the occurrence of the overcurrent supply or the inrush current supply may be prevented.

Figure 8:
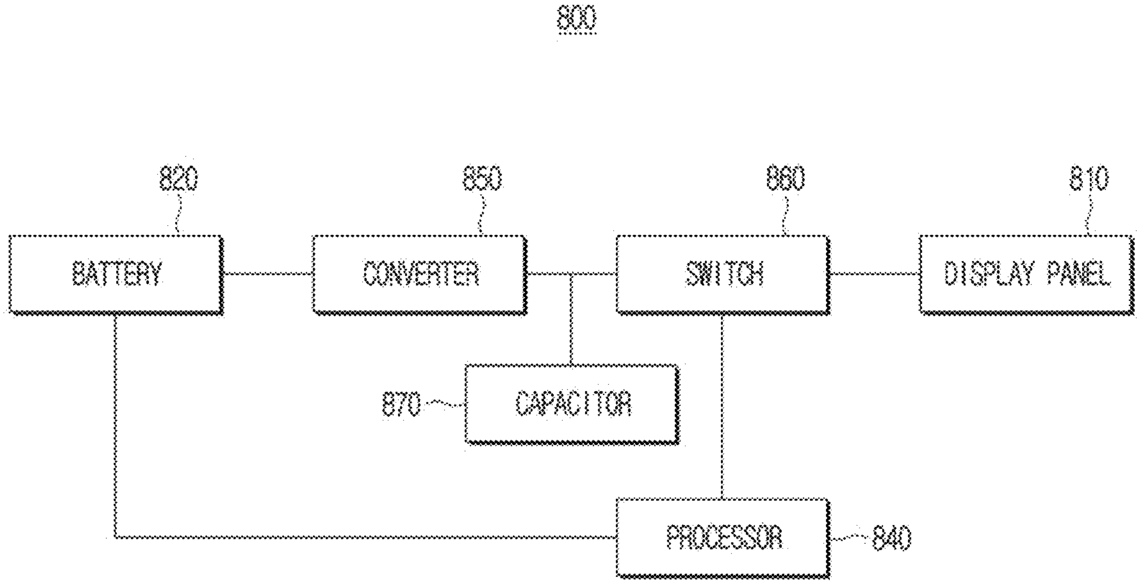
FIG. 8 is a block diagram showing a configuration of a display device including a capacitor and a switch according to one or more embodiments.

FIG. 8 is a block diagram showing a configuration of a display device including a capacitor and a switch according to one or more embodiments.

Referring to FIG. 8, a display device 800 (e.g., the display device 100 in FIG. 2) according to one or more embodiments may include a display panel 810 (e.g., the display panel 110 in FIG. 2), a battery 820 (e.g., the battery 120 in FIG. 2), a processor 840 (e.g., the processor 140 in FIG. 2), a converter 850 (e.g., the converter in FIG. 2), a switch 860 (e.g., the switch in FIG. 5), and a capacitor 870 (e.g., the capacitor in FIG. 5).

In an example, the display panel 810 may be simultaneously turned on based on a screen transition event (e.g., the screen transition event in FIG. 2) based on an operation of the switch 860. For example, the display panel in FIG. 2 may sequentially turn on the plurality of display blocks based on the predetermined order. However, the display panel in FIG. 8 may simultaneously turn on the display blocks. However, the present disclosure is not limited thereto.

In an example, the display panel 810 may receive the electric energy based on the operation of the switch 860. In an example, the display panel 810 may receive the electric energy if the switch 860 is turned on. In an example, the display panel 810 may receive the electric energy during a time period during which the switch 860 is turned on.

In an example, the battery 820 may store the electric energy. In an example, the battery 820 or 120 may be implemented as the (low-power) battery 820 having a full charge voltage less than a predetermined value. In an example, the full charge voltage of the battery 820 may be 3.6 volts (V), is not limited to, and may have a different value.

In an example, the battery 820 may supply the electric energy to the display panel 810. Alternatively, in an example, the electric energy discharged from the battery 820 may be temporarily stored in the capacitor 870 and then supplied to the display panel 810. In an example, the electric energy discharged from the battery 820 may be boosted using the converter 850 and then supplied to the display panel 810.

In an example, the processor 840 may identify a state of charge of the battery 820. In an example, the processor 840 may identify a range (e.g., the predetermined range in FIG. 5) within which the remaining charge of the battery 820 falls, based on the identified state of charge. In an example, the processor 840 may identify a turn-on cycle of the switch 860 (e.g., the cycle in which the switch in FIG. 5 is turned on) corresponding to the range within which the remaining charge of the battery 820 falls, based on information stored in a memory (e.g., the memory 150 in FIG. 2). In an example, the processor 840 may control the switch 860 based on the identified cycle.

In an example, the converter 850 may be connected to the battery 820. In an example, the converter 850 may boost the electric energy output from the battery 820 and supply the same to the display panel 810. In an example, the converter 850 may be connected to at least one of the capacitor 870 or the switch 860. In an example, the converter 850 may transmit the boosted electric energy to the capacitor 870. Alternatively, the converter 850 may transmit (or supply) the boosted electric energy to the display panel 810 via the switch 860.

In an example, the switch 860 may be connected to at least one of the capacitor 870 or the display panel 810. In an example, the switch 860 may supply the electric energy temporarily stored in the capacitor 870 to the display panel 810 based on the control signal received from the processor 840. However, the present disclosure is not limited thereto, and the switch 860 may be connected to the converter 850. In an example, the switch 860 may also supply the electric energy boosted using the converter 850 to the display panel 810.

In an example, the capacitor 870 may temporarily store the electric energy output from the battery 820. In an example, the capacitor 870 may also temporarily store the boosted electric energy if the electric energy output from the battery 820 is boosted using the converter 850. In an example, the capacitor 870 may supply the electric energy to the display panel 810 if the switch 860 is turned on.

Figure 9:
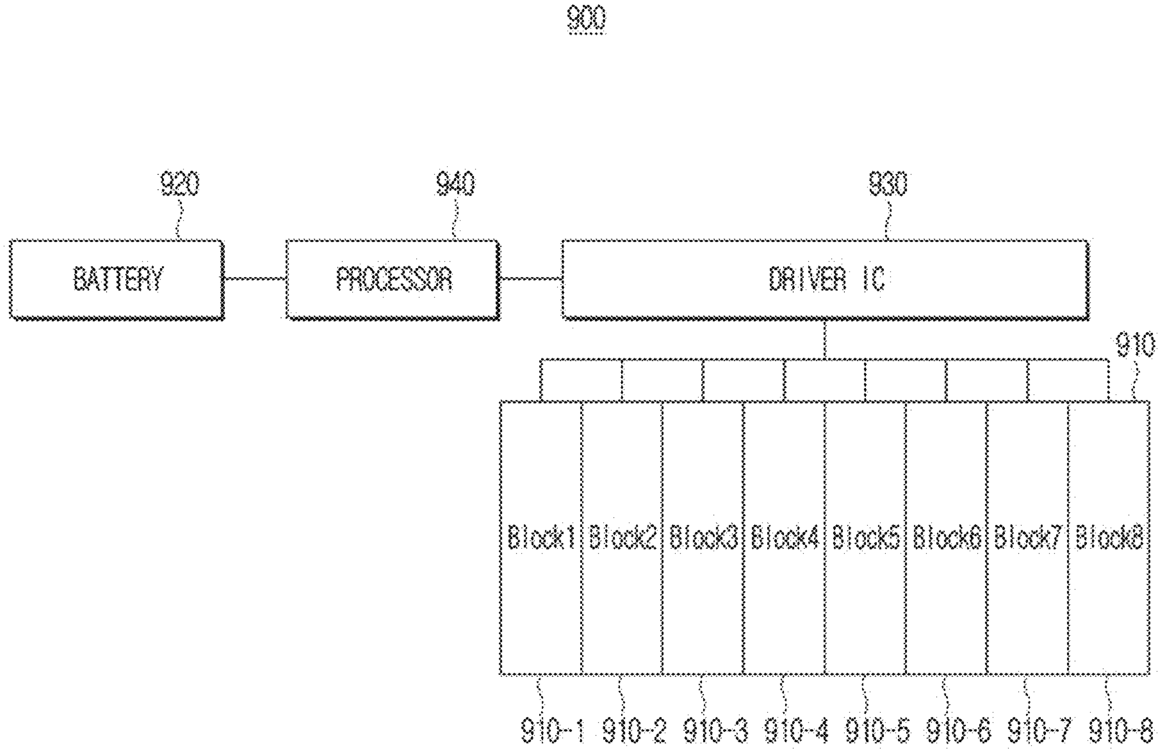
FIG. 9 is a block diagram showing a configuration of a display device including a plurality of driver ICs and a plurality of display blocks according to one or more embodiments.

FIG. 9 is a block diagram showing a configuration of a display device including a plurality of driver ICs and a plurality of display blocks according to one or more embodiments.

Referring to FIG. 9, according to one or more embodiments, a display device 900 (e.g., corresponding to the display device 100 in FIG. 2) may include a display panel 910 (e.g., corresponding to the display panel 110 in FIG. 2), a battery 920 (e.g., corresponding to the battery 120 in FIG. 2), a plurality of driver ICs 930 (e.g., corresponding to the plurality of driver ICs 130 in FIG. 2), and a processor 940 (e.g., corresponding to the processor 140 in FIG. 2), which includes a plurality of display blocks 910-1, 910-2, 910-3, . . . , and 910-8 (e.g., corresponding to the display blocks in FIG. 2).

In an example, the display panel 910 may include the plurality of display blocks 910-1, 910-2, 910-3, . . . , and 910-8. In an example, the number of display blocks may be eight, and is not limited thereto. In an example, the display panel 910 may include a different number of the display blocks than the number shown in FIG. 9. In an example, the display panel 910 may be connected to the plurality of driver ICs 930 and receive the electric energy from the plurality of driver ICs 930. In an example, the driver IC may correspond to each of the plurality of display blocks 910-1, 910-2, 910-3, . . . , and 910-8.

In an example, the battery 920 may supply the electric energy to the display panel 910. According to one or more embodiments, the battery 920 may store the electric energy. In an example, the battery 920 may supply the stored electric energy to the display panel 910. In an example, the battery 920 may be implemented as the low-power battery having a full charge voltage less than the predetermined value. In an example, a full charge voltage of the battery 920 may be 3.6 volts (V), is not limited to, and may have a different value.

In an example, the plurality of driver ICs 930 may include a driver IC corresponding to each of the display blocks. In an example, the plurality of driver ICs 930 may be connected to the plurality of display blocks 910-1, 910-2, 910-3, . . . , and 910-8, respectively. In an example, the plurality of driver ICs 930 may control the display blocks to be turned on or off based on one or more control signals from at least one processor 940. In an example, the plurality of driver ICs 930 may be connected to the battery 920.

In an example, the processor 940 may control the battery 920 and the plurality of driver ICs 930 to supply the electric energy to the display panel 910. According to one or more embodiments, the processor 940 may identify a state of charge of the battery 920. In an example, the processor 940 may control the plurality of driver ICs 930 to turn on the plurality of display blocks 910-1, 910-2, 910-3, . . . , and 910-8 in the identified order if a screen transition event (e.g., the screen transition event in FIG. 2) occurs (or is identified).

In an example, the order in which the display blocks are turned on may be an order in which one or more display blocks among the plurality of display blocks 910-1, 910-2, 910-3, . . . , and 910-8 are turned on simultaneously. For example, the first block 910-1 may be turned on, and the second block 910-2 may then be turned on. After the second block 910-2 is turned on, the third block 910-3 may be turned on. In this way, the identified order may be an order in which the eight display blocks are sequentially turned on one by one.

Alternatively, in an example, there may exist an order in which groups each including a plurality of blocks are sequentially turned on. For example, it may be assumed that the first block 910-1 and the second block 910-2 belong to the first group, the third block 910-3 and the fourth block 910-4 belong to the second group, the fifth block 910-5 and the sixth block 910-6 belong to the third group, and the seventh block 910-7 and the eighth block 910-8 belong to the fourth group. In an example, the processor 940 may identify an order in which the first block 910-1 and the second block 910-2 included in the first group are turned on simultaneously, the third block 910-3 and the fourth block 910-4 included in the second group are then turned on simultaneously, and the blocks included in the third group and the blocks included in the fourth group are then turned on sequentially. However, the present disclosure is not limited thereto, and the number of blocks included in the groups may be different. In an example, the processor 940 may control the driver IC corresponding to each display block based on the identified order if the order in which the display blocks are turned on is identified.

In an example, the number of blocks to be turned on simultaneously may be identified based on a remaining charge of the battery 920. For example, if the remaining charge of the battery 920 is included in a range less than the predetermined value, only the display blocks may be sequentially turned on one by one because there is a higher possibility that the overcurrent supply or the inrush current supply occurs. Alternatively, if the remaining charge of the battery 920 is sufficient (or included in a range greater than the predetermined value), the plurality of block groups may be sequentially turned on because there is a lower possibility that the overcurrent supply occurs. For example, after the first block 910-1 and the second block 910-2 included in the first group as described above are simultaneously turned on, the third block 910-3 and the fourth block 910-4 included in the second group, which is a subsequent group, may be simultaneously turned on. Alternatively, in an example, if the remaining charge of the battery 920 is more than sufficient, the four blocks may be turned on simultaneously.

According to the above-described example, only a predetermined number of blocks among the plurality of display blocks 910-1, 910-2, 910-3, . . . , and 910-8 included in the display panel 910 may be turned on simultaneously, thereby reducing the momentary amount of current supplied to the display panel 910. Accordingly, the inrush current occurrence and the overcurrent occurrence may be prevented.

Figure 10:
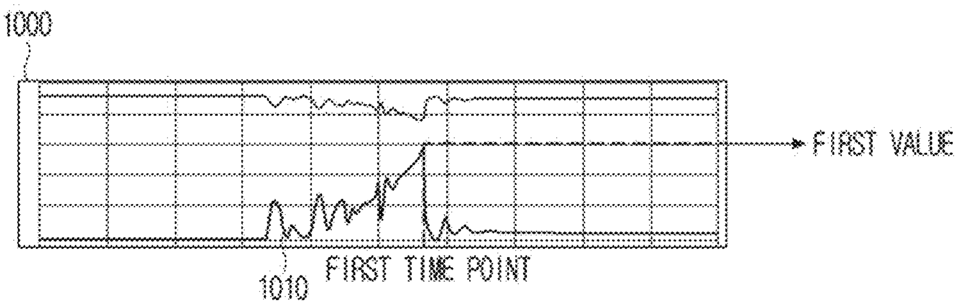
FIG. 10 is a graph for describing current supplied to the display panel according to a comparative example.

FIG. 10 is a graph for describing current supplied to the display panel according to a comparative example.

According to a graph 1000 shown in FIG. 10, the display device according to the comparative example (e.g., the display device in FIG. 1) may supply the electric energy from the battery to the display panel if the screen transition event of the display panel occurs.

In an example, an amount of current 1010 supplied to the display panel over time may increase if the screen transition event occurs. In an example, based on the remaining charge of the battery, the overcurrent may be supplied to the display panel at a specific time point (e.g., a first time point). For example, if a current greater than the predetermined value (a first value, e.g., 6 ampere (A)) is supplied to the display panel, the display device may enter the over current protection (OCP).

Figure 11:
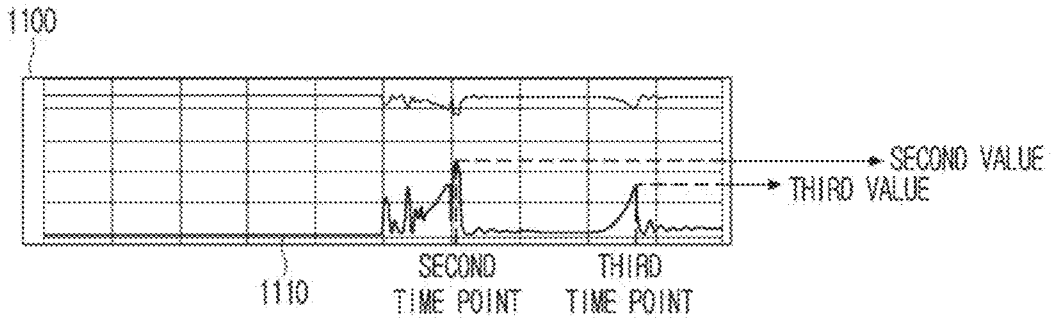
FIG. 11 is a graph for describing current supplied to the display panel according to one or more embodiments.

FIG. 11 is a graph for describing current supplied to the display panel according to one or more embodiments.

According to a graph 1100 shown in FIG. 11, a display device (e.g., the display device 100 in FIG. 2) according to one or more embodiments may supply electric energy from a battery (e.g., the battery 120 in FIG. 2) to the display panel if a screen transition event (e.g., the screen transition event in FIG. 2) corresponding to the display panel (e.g., the display panel 110 in FIG. 2) occurs.

In an example, the display device may include a plurality of display blocks (e.g., the display blocks in FIG. 2), and in an example, the display device may identify an order in which the plurality of display blocks including the first block and the second block are turned on (e.g., the first order). In other words, the plurality of display blocks are turned on at different times. For example, it may be assumed that the first block is turned on and the second block is then turned on. In an example, if the screen transition event occurs, the display device may turn on the first block at a time point prior to the predetermined time from a second time point, and then turn on the second block at a time point prior to the predetermined time from a third time point. Accordingly, an amount of current 1110 supplied to the display panel over time may be a second value (or a second peak value) at the second time point, and may be a third value (or a third peak value) at the third time point.

In an example, each of the second value and the third value may be less than the first value in FIG. 10. In an example, referring to FIG. 11, the sum of the second value and the third value (e.g., 4.89 ampere (A)) may be less than the first value (e.g., 6 A).

Alternatively, in an example, the display device may include a capacitor (e.g., the capacitor in FIG. 5) and a switch (e.g., the switch in FIG. 5). In an example, the display device may identify the first cycle in which the switch is turned on based on the remaining charge of the battery. In an example, the display device may preferentially turn on the switch at a specific time point (e.g., a time point prior to the second time point) based on the identified first cycle (e.g., the first cycle in FIG. 6). The display device may turn off the switch after the predetermined time period elapses from a time point at which the switch is turned on. The display device may turn on the switch back at a time point at which the predetermined time period elapses from the time point at which the switch is turned on (e.g., a time point prior to the third time point). In an example, as shown in FIG. 11, in a period in which the switch is turned on, the current supplied to the display panel may form the peak value at a specific time point (e.g., the second time point or the third time point). In an example, unlike the comparative example shown in FIG. 10, the display device according to the present disclosure may turn on the switch in the identified cycle/the cycle identified based on the remaining charge of the battery, thereby decreasing the amount of current (e.g., a peak value of the current) generated at the specific time point. For example, the sum of the second value and the third value may be a value smaller than the first value. The display device may control the switch to enable the inrush current caused by the remaining charge of the battery to be distributed, thereby preventing the inrush current occurrence and the overcurrent occurrence.

Figure 12:
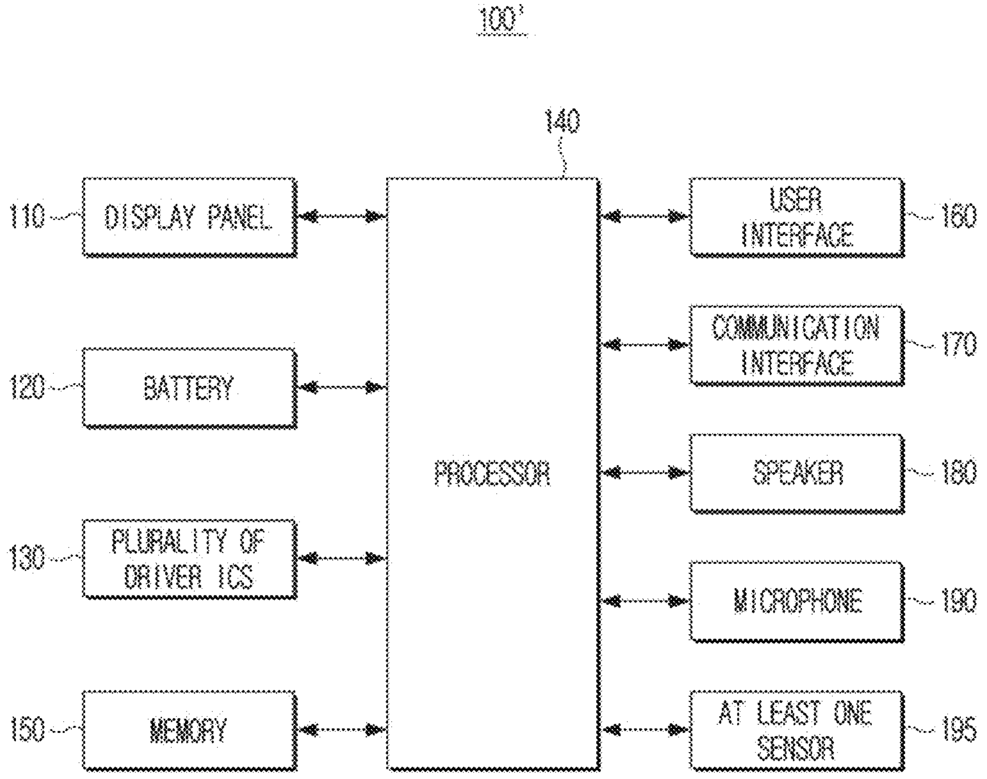
FIG. 12 is a block diagram showing a detailed configuration of a display device according to one or more embodiments.

FIG. 12 is a block diagram showing a detailed configuration of a display device according to one or more embodiments.

Referring to FIG. 12, a display device 100' may include the display panel 110, the battery 120, the plurality of driver ICs 130, at least one processor 140, the memory 150, a user interface 160, a communication interface 170, a speaker 180, a microphone 190, and at least one sensor 195. Detailed descriptions of configurations shown in FIG. 12 that overlap with the configurations shown in FIG. 2 are omitted.

The user interface 160 is a component for enabling the display device 100' to perform interaction with the user. For example, the user interface 160 may include at least one of a touch sensor, a motion sensor, a button, a jog dial, a switch, a microphone, or a speaker, and is not limited thereto.

The communication interface 170 may input and output various types of data. For example, the communication interface 170 may transmit and receive the various types of data to and from an external device (e.g., a source device), an external storage medium (e.g., a universal serial bus (USB) memory), an external server (e.g., a web hard) by using a communication method such as access point (AP)-based wireless fidelity (Wi-Fi, wireless local area network (LAN)), Bluetooth, Zigbee, wired/wireless local area network (LAN), wide area network (WAN), Ethernet, IEEE 1394, high definition multimedia interface (HDMI), universal serial bus (USB), mobile high-definition link (MHL), audio engineering society/European broadcasting union (AES/EBU) communication, optical communication, or coaxial communication.

In an example, the communication interface 170 may include a Bluetooth low energy (BLE) module. The BLE refers to a Bluetooth technology that enables transmission and reception of low-power and low-capacity data in a 2.4 gigahertz (GHz) frequency band having a range of about 10 m. However, the present disclosure is not limited thereto, and the communication interface 170 may include a Wi-Fi communication module. That is, the communication interface 170 may include at least one of the Bluetooth low energy (BLE) module or the Wi-Fi communication module.

According to one or more embodiments, the speaker 180 may include a tweeter for reproducing high-frequency sounds, a midrange for reproducing medium-frequency sounds, a woofer for reproducing low-frequency sounds, a subwoofer for reproducing ultra-low-frequency sounds, an enclosure for controlling resonance, a crossover network for dividing a frequency of an electric signal input into the speaker into bands, or the like.

According to one or more embodiments, the speaker 180 may output an audio signal to the outside of the display device 100'. The speaker 180 may output multimedia reproduction, recording reproduction, various notification sounds, voice messages, or the like. The display device 100' may include an audio output device such as the speaker 180, and may include an output device such as an audio output terminal. In particular, the speaker 180 may provide obtained information, information processed and produced based on the obtained information, a response result to a user voice, or an operation result, or the like in a voice form.

The microphone 190 may refer to a module that obtains sound and converts the same into the electric signal, and may be implemented as a condenser microphone, a ribbon microphone, a moving coil microphone, a piezoelectric element microphone, a carbon microphone, a micro electro mechanical system (MEMS) microphone. In addition, the microphone 190 may be implemented in an omnidirectional, bidirectional, unidirectional, subcardioid, supercardioid, hypercardioid manner. According to one or more embodiments, the display device 100' may include the microphone 190 and an inner microphone, and the microphone 190 may be a microphone positioned relatively outside a body. In an example, the display device 100' may obtain an audio signal including external noise through the microphone 190. According to one or more embodiments, the microphone 190 may be disposed in a direction opposite to a direction in which the speaker 180 emits sound.

At least one sensor 195 (hereinafter referred to as the sensor) may include a plurality of sensors of various types. The sensor 195 may measure a physical quantity or detect an operating state of the display device 100', and convert the measured or detected information into the electrical signal. The sensor 195 may include a camera, and the camera may include a lens that focuses visible light or other optical signals reflected from an object and received onto an image sensor, and the image sensor capable of detecting visible light or other optical signals. Here, the image sensor may include a two-dimensional (2D) pixel array divided into a plurality of pixels. Alternatively, at least one sensor 195 may include a temperature sensor or an infrared sensor.

According to the above-described example, even if the display device 100' supplies the electric energy from the low-power battery to the display panel 110, the display device 100' may sequentially turn on the plurality of display blocks included in the display panel 110, thereby preventing the overcurrent supply or the inrush current supply and preventing the display device 100' from entering the over current protection (OCP).

Alternatively, according to the above-described example, the display device 100' may reduce the size of the cycle in which the switch is turned on as the remaining charge of the battery 120 decreases, thereby efficiently controlling the amount of current to which the display device may respond. Accordingly, the occurrence of the overcurrent supply or the inrush current supply may be prevented.

Meanwhile, the methods according to the various embodiments of the present disclosure described above may be implemented in the form of an application which may be installed on an existing display device. Alternatively, the methods according to the various embodiments of the present disclosure described above, for example, determining the arrangement state of the GUI items based on a viewing angle area, may be performed using a deep learning-based learned neural network (or deep learned neural network), i.e., learning network model. In addition, the methods according to the various embodiments of the present disclosure described above may be implemented only by software upgrade or hardware upgrade of an existing display device. In addition, the various embodiments of the present disclosure described above may be performed using an embedded server included in the display device, or an external server of the display device.

Meanwhile, according to one or more embodiments of the present disclosure, the various embodiments described above may be implemented in software including an instruction stored on a machine-readable storage medium (for example, a computer-readable storage medium). A machine may be a device that invokes the stored instruction from a storage medium, may be operated based on the invoked instruction, and may include the display device (e.g., display device A) according to the disclosed embodiments. If the instruction is executed by the processor, the processor may directly perform a function corresponding to the instruction or other components may perform the function corresponding to the instruction under the control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored on the storage medium.

In addition, according to one or more embodiments of the present disclosure, the methods according to the various embodiments described above may be included and provided in a computer program product. The computer program product may be traded as a commodity between a seller and a purchaser. The computer program product may be distributed in a form of the machine-readable storage medium (for example, a compact disc read only memory (CD-ROM)), or may be distributed online through an application store (for example, PlayStore™. In case of the online distribution, at least a portion of the computer program product may be at least temporarily stored or temporarily generated on a storage medium such as the memory of a manufacturer server, an application store server, or a relay server.

In addition, each of the components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into the single entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although the embodiments are shown and described in the present disclosure as above, the present disclosure is not limited to the above-described specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. A display device comprising:

a display panel comprising a plurality of display blocks;

a battery configured to supply electric energy to the display panel;

a plurality of driver integrated circuits (ICs) connected to the plurality of display blocks;

at least one processor comprising processing circuitry; and memory storing instructions and comprising at least one storage medium, wherein the instructions, when executed by the at least one processor individually or collectively, cause the display device to:

identify a state of charge of the battery;

identify a remaining charge of the battery as being in a first range based on the state of the charge; and based on a screen transition event of the display panel and the remaining charge of the battery being in the first range, control the plurality of driver ICs to turn on the plurality of display blocks at different times in a first order.

2. The display device as claimed in claim 1, wherein the display panel is an electrophoretic display, and wherein the electric energy is supplied to the display panel in the screen transition event.

3. The display device as claimed in claim 1, wherein the plurality of display blocks comprises a first block and a second block, wherein the plurality of driver ICs comprises a first driver IC corresponding to the first block and a second driver IC corresponding to the second block, and wherein the instructions, when executed by the at least one processor individually or collectively, further cause the display device to:

transmit a first control signal to the first driver IC to turn on the first block based on the screen transition event of the display panel occurring; and transmit a second control signal to the second driver IC to turn on the second block based on the first control signal being transmitted to the first driver IC.

4. The display device as claimed in claim 3, wherein each of the first block and the second block comprises at least one display block.

5. The display device as claimed in claim 1, wherein the battery is a low-power battery having a full charge voltage less than a predetermined value.

6. The display device as claimed in claim 1, further comprising:

a converter configured to boost an output voltage of the battery and supply the boosted output voltage to the display panel.

7. The display device as claimed in claim 1, further comprising:

a capacitor connected to the battery and configured to store the electric energy output from the battery; and a switch connected to the capacitor and the display panel, wherein the instructions, when executed by the at least one processor individually or collectively, further cause the display device to:

determine a cycle in which the switch is turned on based on the state of the charge; and supply the electric energy stored in the capacitor to the display panel, during the cycle.

8. The display device as claimed in claim 7, wherein the instructions, when executed by the at least one processor individually or collectively, further cause the display device to:

determine a first cycle corresponding to the remaining charge of the battery being in a second range; and supply the electric energy stored in the capacitor to the display panel during the first cycle.

9. The display device as claimed in claim 8, wherein the instructions, when executed by the at least one processor individually or collectively, further cause the display device to:

determine a second cycle shorter than the first cycle, the second cycle corresponding to the remaining charge of the battery being in a third range less than the second range; and supply the electric energy stored in the capacitor to the display panel during the second cycle.

10. The display device as claimed in claim 1, wherein the at least one processor is a micro controller unit.

11. An operating method of a display device, the method comprising:

identifying a state of charge of a battery supplying electric energy to a display panel comprising a plurality of display blocks;

identifying a remaining charge of the battery as being in a first range based on the state of the charge; and based on a screen transition event of the display panel and the remaining charge of the battery being in the first range, controlling a plurality of driver integrated circuits (ICs) respectively connected to the plurality of display blocks to turn on the plurality of display blocks at different times in a first order.

12. The method as claimed in claim 11, wherein the display panel is an electrophoretic display, and wherein the electric energy is supplied to the display panel in the screen transition event.

13. The method as claimed in claim 11, wherein the plurality of display blocks includes a first block and a second block, and the plurality of driver ICs includes a first driver IC corresponding to the first block and a second driver IC corresponding to the second block, the method comprising:

transmitting a first control signal to the first driver IC to turn on the first block based on the screen transition event of the display panel occurring; and transmitting a second control signal to the second driver IC to turn on the second block based on the first control signal being transmitted to the first driver IC.

14. The method as claimed in claim 13, wherein each of the first block and the second block includes at least one display block.

15. The method as claimed in claim 11, wherein the battery is a low-power battery having a full charge voltage less than a predetermined value.

16. The method as claimed in claim 11, further comprising:

boosting an output voltage of the battery and supplying the boosted output voltage to the display panel, using a converter.

17. The method as claimed in claim 11, further comprising:

storing the electric energy output from the battery, using a capacitor;

determining a cycle in which a switch connected to the capacitor and the display panel is turned on, based on the state of the charge; and supplying the electric energy stored in the capacitor to the display panel during the cycle.

18. The method as claimed in claim 17, further comprising:

determining a first cycle corresponding to the remaining charge of the battery being in a second range; and supplying the electric energy stored in the capacitor to the display panel during the first cycle.

19. The method as claimed in claim 18, further comprising:

determining a second cycle shorter than the first cycle, the second cycle corresponding to the remaining charge of the battery being in a third range less than the second range; and supplying the electric energy stored in the capacitor to the display panel during the second cycle.

20. A non-transitory computer readable storage medium storing computer-readable instructions, wherein the instructions, when executed by at least one processor of a display device individually or collectively, cause the display device to: identify a state of charge of a battery supplying electric energy to a display panel including a plurality of display blocks; identify a remaining charge of the battery as being in a first range based on the state of the charge; and based on a screen transition event of the display panel and the remaining charge of the battery being in the first range, control a plurality of driver integrated circuits (ICs) respectively connected to the plurality of display blocks to turn on the plurality of display blocks at different times in a first order.

* * * * *